United States Patent
Kwean

(10) Patent No.: US 7,538,601 B2
(45) Date of Patent: May 26, 2009

(54) STEP-UP VOLTAGE GENERATOR FOR SEMICONDUCTOR MEMORY AND METHOD FOR CONTROLLING THE SAME

(75) Inventor: Ki Chang Kwean, Icheon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 25 days.

(21) Appl. No.: 11/647,777

(22) Filed: Dec. 28, 2006

(65) Prior Publication Data

US 2008/0042728 A1    Feb. 21, 2008

(30) Foreign Application Priority Data

Jun. 30, 2006    (KR) ............... 10-2006-0061489

(51) Int. Cl.
*G05F 1/10*    (2006.01)
*G05F 3/02*    (2006.01)

(52) U.S. Cl. .............. 327/536; 327/537; 365/189.09; 365/189.11

(58) Field of Classification Search ............ 365/189.09, 365/189.11; 327/536, 537
See application file for complete search history.

(56) References Cited

U.S. PATENT DOCUMENTS 6,026,049 A * 2/2000 Park .................... 365/233.1
6,038,178 A    3/2000 Oh
6,285,622 B1 * 9/2001 Haraguchi et al. .......... 365/226
6,646,494 B2 * 11/2003 Dohi et al. ................. 327/536
7,091,769 B2 * 8/2006 Kwon et al. ................. 327/536

FOREIGN PATENT DOCUMENTS

KR    10-1998-0041239    8/1998
KR    10-2003-0001866    8/2003

* cited by examiner

*Primary Examiner*—Kenneth B Wells
*Assistant Examiner*—John W Poos
(74) *Attorney, Agent, or Firm*—John P. White; Cooper & Dunham LLP

(57) ABSTRACT

A step-up voltage generator for a semiconductor memory is provided which includes a level detection unit, a bank-active command generator, and an oscillation signal generator. The level detection unit compares a reference voltage with a division voltage of a pumping voltage, detects a level of the pumping voltage according to the comparison result, and generates a level detection signal. The bank-active command generator generates bank-active signals in response to a row-active command signal. The oscillation signal generator determines whether it received the bank-active signals from the bank-active command generator, replies to the bank-active signals or the level detection signal according to the determination result, and generates oscillation signals. An active-voltage UP converter performs pumping of a power-supply voltage in response to the oscillation signals, and generates a step-up voltage.

9 Claims, 5 Drawing Sheets

STEP-UP VOLTAGE GENERATOR FOR SEMICONDUCTOR MEMORY AND METHOD FOR CONTROLLING THE SAME

TECHNICAL FIELD

The present disclosure relates to a step-up voltage generator for a semiconductor memory and a method for controlling the same, which can minimize a pumping voltage capable of instantaneously dropping by an active operation of the semiconductor memory.

DESCRIPTION OF THE RELATED ART

FIG. 1 is a circuit diagram illustrating an oscillation signal generator of a conventional semiconductor memory. FIG. 2 is a waveform diagram illustrating operation signals of a step-up voltage generator of the conventional semiconductor memory.

Referring to FIG. 1, the conventional oscillation signal generator includes a plurality of NAND gates $10 \sim 1n$ and a plurality of inverters $20 \sim 2n$.

The NAND gates $10 \sim 1n$ receive a level-detection signal (DET) of a pumping voltage (Vpp) generated from a level detection unit (not shown) at one input terminal, and receive bank-active command signals (BANK1_act~BANKn_act) generated from a bank-active command generator (not shown) at other input terminals. The inverters $20 \sim 2n$ invert output signals of the NAND gates $10 \sim 1n$, respectively, and then generate oscillation signals OSCn~OSCn, respectively.

The semiconductor memory device includes a plurality of banks, each of which includes an independent active-voltage UP converter. If the level of the pumping voltage (Vpp) is less than a target level, the DET signal enters a high level to perform the pumping operation, such that the high-level DET signal is applied to the NAND gates ($10 \sim 1n$), and the bank-active command signals (BANK1_act~BANKn_act) are applied to the NAND gates $10 \sim 1n$, respectively.

In this case, if a first bank is activated, the first bank-active command signal (BANK1_act) is generated. The first bank-active command signal (BANK1_act) is applied to the NAND gate 11. The NAND gate 11 transmits the first oscillation signal (OSC1) to a first active-voltage UP converter (not shown) corresponding to the first bank. Therefore, the first active-voltage UP converter performs the pumping operation, such that it generates the pumping voltage (Vpp).

In this way, if a second bank to a N-th bank are activated, the bank-active command signals (BANK1~BANKn) are generated, such that NAND gates ($12 \sim 1n$) transmit second to n-th oscillation signals (OSC2~OSCn) to the second to N-th active-voltage UP converters corresponding to the second to n-th banks, respectively. Therefore, each of the second to n-th active-voltage UP converter performs the pumping operation, and generates the pumping voltage (Vpp).

Generally, the level detection unit has a considerably slow response time. Therefore, the level detection unit slowly reacts to a pumping voltage (Vpp) after the pumping voltage (Vpp) is less than a target value, such that a relatively long period of time is required to enable the level detection signal (DET).

As shown in FIG. 2, the pumping operation is performed after the DET signal has been generated. The level detection unit has a considerably slow response time, and generates the DET signal after the level of the pumping voltage (Vpp) is less than a target level by a predetermined voltage Vd1, such that the resultant pumping voltage Vpp occurs.

Therefore, the banks of the semiconductor memory are activated and a predetermined period of time elapses, and then the level of the pumping voltage (Vpp) is detected, such that a current signal of the pumping voltage (Vpp) is substantially consumed, resulting in reduction of the pumping voltage (Vpp).

In other words, the conventional step-up voltage generator for the semiconductor memory controls the DET signal to be enabled at the outside of a current-consumption area (R1) of the pumping voltage (Vpp), and performs the pumping operation after the pumping voltage (Vpp) drops by a predetermined voltage (Vd1), such that the level of the pumping voltage (Vpp) drops during the bank-active operation. As a result, the conventional step-up voltage generator has very weak resistance to the driving of a memory cell.

There is a need for a step-up voltage generator for a semiconductor memory and a method for controlling the same, which can reply to a bank-active signal at a time earlier than that of a level detection signal of a pumping voltage having a response speed slower than that of a bank-active command signal received in the semiconductor memory, can firstly perform a pumping operation, thereby minimizing an instantaneous drop of the pumping voltage.

SUMMARY

In accordance with one aspect of the present disclosure, a step-up voltage generator for a semiconductor memory is provided which comprises a level detection unit for comparing a reference voltage with a division voltage of a pumping voltage, detecting a level of the pumping voltage according to the comparison result, and generating a level detection signal, a bank-active command generator for generating bank-active signals in response to a row-active command signal, an oscillation signal generator for determining whether it received the bank-active signals from the bank-active command generator, replying to the bank-active signals or the level detection signal according to the determination result, and generating oscillation signals, and an active-voltage UP converter for pumping a power-supply voltage in response to the oscillation signals, and generating a step-up voltage.

Preferably, the oscillation signal generator includes a pulse generator for generating pulse signals in response to the bank-active signals, a first logic circuit for performing a NAND operation in response to the bank-active signals and the level detection signal, and a second logic circuit for performing a NAND operation in response to output signals of the first logic circuit and the pulse generator.

Preferably, the first logic circuit includes at least one NAND gate, and the second logic circuit includes at least one NAND gate.

Preferably, the pulse generator includes an inverter chain for delaying the bank-active signals by a predetermined time, and a third logic circuit for performing a NAND operation in response to an output signal of the inverter chain and the bank-active signals.

Preferably, the third logic circuit is composed of a NAND gate.

In accordance with another aspect of the present disclosure, a step-up voltage generator for a semiconductor memory is provided which comprises a bank-active input unit including pulse generators for generating pulse signals in response to bank-active signals, and a driving-signal generator for determining whether it received the bank-active signals from the bank-active input unit, and generating driving signals in response to the bank-active signals or a level detection signal of a pumping voltage.

Preferably, the step-up voltage generator further comprises a level detection unit for comparing a reference voltage with a division voltage of the pumping voltage, detecting a level of the pumping voltage according to the comparison result, and transmitting the level detection signal to the driving-signal generator.

Preferably, the step-up voltage generator further comprises an active-voltage UP converter for pumping a power-supply voltage in response to the driving signals, and generating a step-up voltage.

In accordance with still another aspect of the present disclosure, a method for controlling a step-up voltage generator of a semiconductor memory is provided which includes receiving a level detection signal from a level detection unit for detecting a level of a pumping voltage by comparing a reference voltage with a division voltage of the pumping voltage, determining whether bank-active signals are received from a bank active command generator, and replying to the bank active signals or the level detection signal according to the determination result, and generating oscillation signals.

Preferably, the method further includes upon receiving the bank-active signals, generating pulse signals in response to the bank-active signals, and generating oscillation signals in response to the pulse signals, the bank-active signals, and the level detection signal, and if the bank-active signals are not received, oscillating the oscillation signals according to the level detection signal.

As described above, the step-up voltage generator of the semiconductor memory according to the present disclosure, if the bank-active command signal is received in the semiconductor memory, replies to the bank-active signals at a time earlier than the level detection signal of the pumping voltage having a slow response speed, and performs the pumping operation at a time earlier than the level detection signal, such that the degree of instantaneous pumping-voltage drop is minimized.

BRIEF DESCRIPTION OF THE DRAWINGS

The above-mentioned and other features and other advantages of the subject matter of the present disclosure will be more clearly understood from the following detailed description taken in conjunction with the accompanying drawings, in which.

DESCRIPTION OF THE PREFERRED EMBODIMENTS

Figure 1:
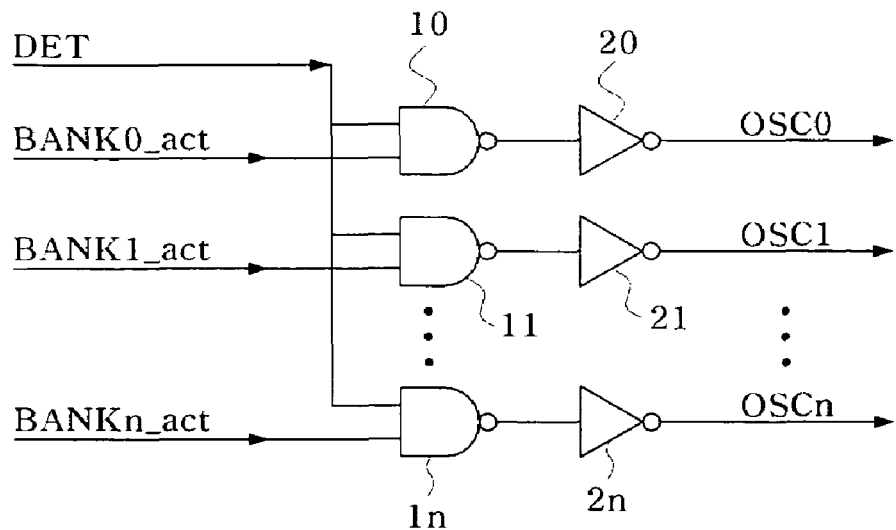
FIG. 1 is a circuit diagram illustrating an oscillation signal generator of a conventional semiconductor memory.

Now, preferred embodiments of the present disclosure will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present disclosure rather unclear.

Figure 3:
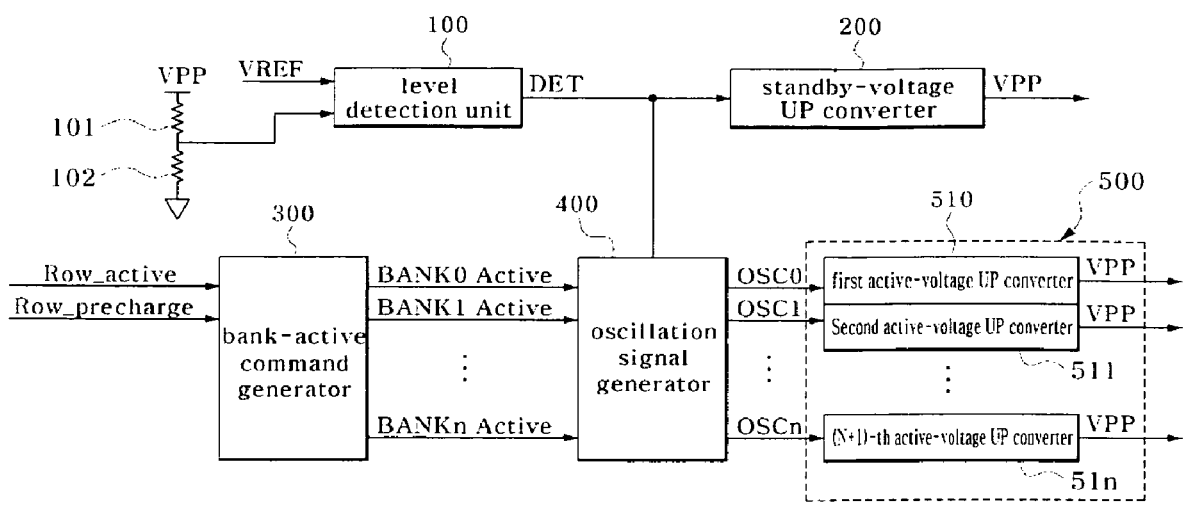
FIG. 3 is a block diagram illustrating a step-up voltage generator for a semiconductor memory according to a preferred embodiment of the present disclosure.
Figure 4:
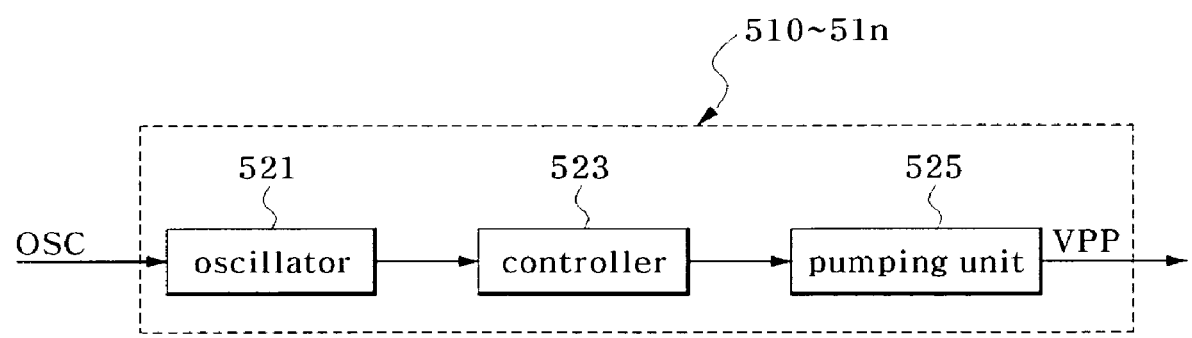
FIG. 4 is a block diagram illustrating an active-voltage UP converter according to an exemplary embodiment of the present disclosure.
Figure 5:
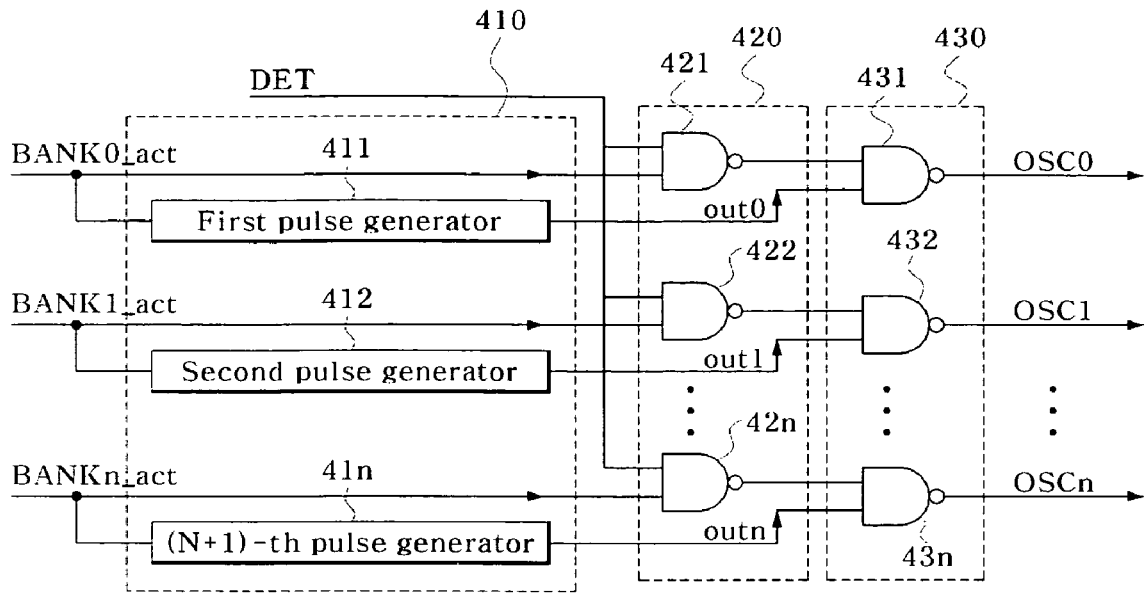
FIG. 5 is a detailed circuit diagram illustrating an oscillation signal generator for a semiconductor memory according to an exemplary embodiment of the present disclosure.
Figure 6:
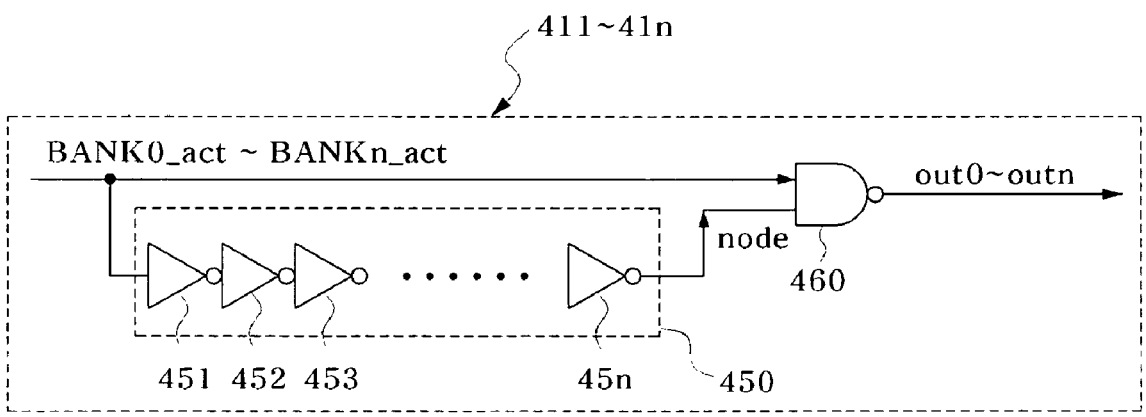
FIG. 6 is a detailed circuit diagram illustrating a pulse generator contained in the oscillation signal generator of FIG. 1 according to an exemplary embodiment of the present disclosure.

FIG. 3 is a block diagram illustrating a step-up voltage generator for a semiconductor memory according to an exemplary embodiment of the present disclosure. FIG. 4 is a block diagram illustrating an active-voltage UP converter according to an exemplary embodiment of the present disclosure. FIG. 5 is a detailed circuit diagram illustrating an oscillation signal generator for a semiconductor memory according to an exemplary embodiment of the present disclosure. FIG. 6 is a detailed circuit diagram illustrating a pulse generator contained in the oscillation signal generator of FIG. 1 according to an exemplary embodiment of the present disclosure.

Referring to FIGS. 3~6, a step-up voltage generator for the semiconductor memory according to an exemplary embodiment of the present disclosure includes a level detection unit 100, a bank-active command generator 300, an oscillation signal generator 400, and an active-voltage UP converter 500.

The level detection unit 100 compares the reference voltage (Vref) with a division voltage of a pumping voltage (Vpp), detects a level of the pumping voltage (Vpp) according to the compared result, and generates a level detection signal (DET).

The bank-active command generator 300 generates bank-active signals (BANK0act~BANKn_act) in response to a row-active command signal (Row_active).

The oscillation signal generator 400 determines whether it received the bank-active signals from the bank-active command generator 300, replies to the bank-active signals (BANK0_act~BANKn_act) or the level detection signal (DET) according to the determination result, and generates the oscillation signals (OSC0~OSCn). The active-voltage UP converter 500 pumps a power-supply voltage in response to the oscillation signals (OSC0~OSCn), and generates a step-up voltage (Vpp).

As shown in FIG. 5, the oscillation signal generator 400 includes a pulse generator 410, a first logic circuit 420, and a second logic circuit 430.

The pulse generator 410 generates the pulse signals (out0~outn) in response to the bank-active signals (BANK0_act~BANKn_act). The first logic circuit 420 performs a NAND operation in response to the bank-active signals (BANK0_act~BANKn_act) and the level detection signal (DET). The second logic circuit 430 performs a NAND operation in response to output signals of the first logic circuit 420 and the pulse generator 410.

The first logic circuit 420 is composed of NAND gates 421~42n. The second logic circuit 430 is composed of NAND gates 431~43n.

The pulse generator 410 includes an inverter chain 450 and a third logic circuit 460. The inverter chain 450 delays the bank-active signals (BANK0_act~BANKn_act) by a predetermined time. The third logic circuit 460 performs a NAND operation in response to the output signal of the inverter chain 450 and the bank-active signals (BANK0_act~BANKn_act).

The third logic circuit 460 is composed of a NAND gate.

Figure 9:
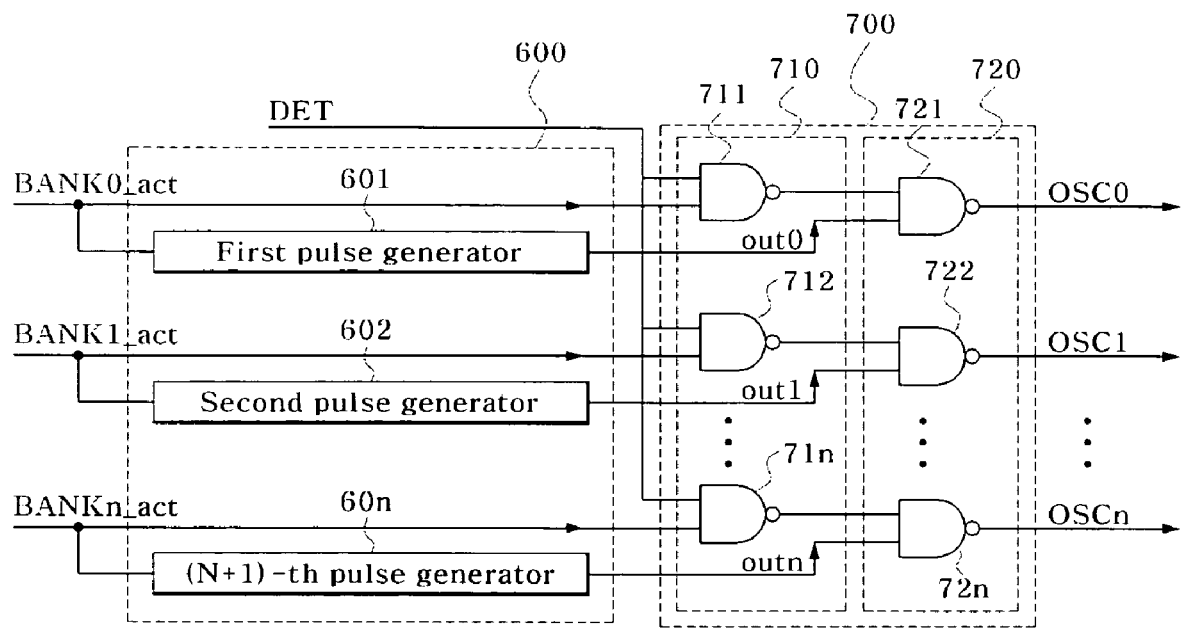
FIG. 9 is a circuit diagram illustrating a step-up voltage generator for a semiconductor memory according to another preferred embodiment of the present disclosure.

FIG. 9 is a circuit diagram illustrating a step-up voltage generator for a semiconductor memory according to another preferred embodiment of the present disclosure.

Referring to FIG. 9, the step-up voltage generator according to a preferred embodiment of the present disclosure includes a bank-active input unit 600 and a driving-signal generator 700. The bank-active input unit includes pulse generators (601, 602, and 60n) for generating pulse signals in response to bank-active signals (BANK0_act~BANKn_act). The driving-signal generator 700 determines whether it received the bank-active signals (BANK0_act~BANKn_act) from the bank-active input unit 600, and generates driving signals (OSC0~OSCn) in response to the bank-active signals (BANK0_act~BANKn_act) or a level detection signal (DET) of a pumping voltage.

The step-up voltage generator further includes a level detection unit 100 (See FIG. 3) for comparing a reference voltage (VREF) with a division voltage (VPP) of the pumping voltage, detecting a level of the pumping voltage according to the comparison result, and transmitting the level detection signal (DET) to the driving-signal generator 700.

The step-up voltage generator further includes an active-voltage UP converter 500 (FIG. 3) for pumping a power-supply voltage in response to the driving signals (OSC0~OSCn), and generating a step-up voltage.

The driving signal generator includes a first logic circuit 710 for performing a NAND operation in response to the bank-active signals (BANK0_act~BANKn_act) and the level detection signal (DET), and a second logic circuit 720 for performing a NAND operation in response to output signals of the first logic circuit 710 and the bank-active input unit 600.

The bank-active input unit includes an inverter chain 450 (FIG. 6) for delaying the bank-active signals by a predetermined time, and a third logic circuit 460 (FIG. 6) for performing a NAND operation in response to an output signal of the inverter chain and the bank-active signals.

A method for controlling the step-up voltage generator of the semiconductor memory includes a) receiving a level detection signal (DET) from a level detection unit for detecting a level of a pumping voltage by comparing a reference voltage (Vref) with a division voltage of the pumping voltage (Vpp), b) determining whether bank-active signals (BANK0_act~BANKn_act) are received from a bank active command generator 300, and c) replying to the bank active signals (BANK0_act~BANKn_act) or the level detection signal (DET) according to the determination result, and generating oscillation signals (OSC0~OSCn).

The method may additionally include c1) upon receiving the bank-active signals (BANK0_act~BANKn_act), by a pulse generator 410, generating pulse signals (out0~outn) in response to the bank-active signals (BANK0_act~BANKn_act), and generating oscillation signals (OSC0~OSCn) in response to the pulse signals (out0~outn), the bank-active signals (BANK0_act~BANKn_act), and the level detection signal (DET), and c2) if the bank-active signals (BANK0_act~BANKn_act) are not received in the pulse generator 410, oscillating the oscillation signals (OSC0~OSCn) according to the level detection signal (DET).

Operations of the above-mentioned step-up voltage generator for the semiconductor memory will hereinafter be described with reference to FIGS. 3~8.

Figure 7:
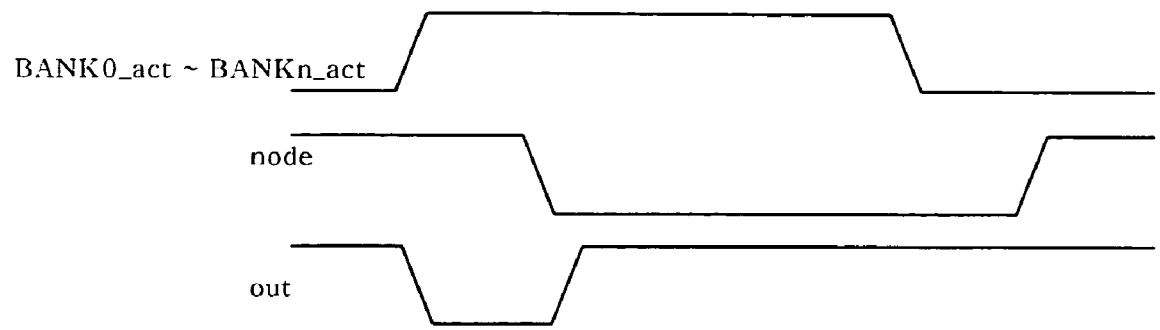
FIG. 7 is a waveform diagram illustrating the pulse generator shown in FIG. 6.
Figure 8:
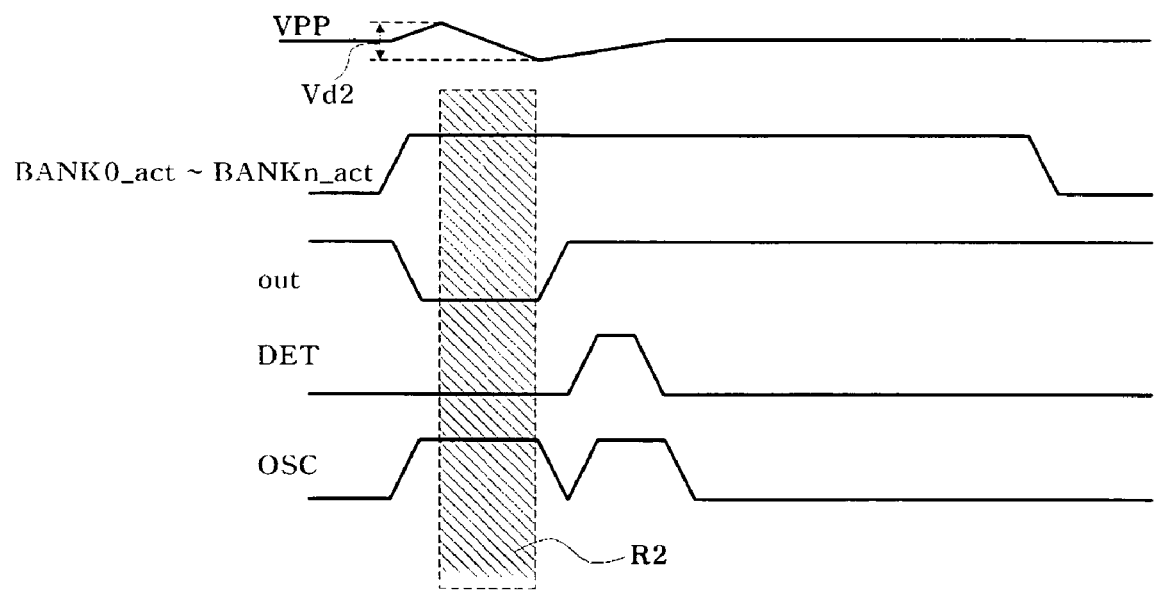
FIG. 8 is a waveform diagram illustrating operation signals of a step-up voltage generator for a semiconductor memory according to a preferred embodiment of the present disclosure.

FIG. 7 is a waveform diagram illustrating operations of the pulse generator shown in FIG. 6. FIG. 8 is a waveform diagram illustrating operation signals of a step-up voltage generator for a semiconductor memory according to an exemplary embodiment of the present disclosure.

Referring to FIG. 3, the level detection unit 100 compares the reference voltage (Vref) with a pumping voltage (Vpp) generated by resistors 101 and 102. If the division voltage of the pumping voltage (Vpp) is less than the reference voltage (Vref), the level detection unit generates a high-level DET signal. In this case, it should be noted that the Vpp's division voltage less than the reference voltage (Vref) indicates that the Vpp-level is less than a target-voltage level.

A standby-voltage UP converter 200 generates the pumping voltage (Vpp) in response to the level detection signal (DET) received from the level detection unit 100. If 0-th to N-th banks (not shown) of the semiconductor memory are activated in response to a row-active signal (ROW_act) and a row-precharge signal (ROW_pre), the bank-active command generator 300 transmits the bank-active command signals (BANK0_act~BANKn_act) to the oscillation signal generator 400.

The oscillation signal generator 400 generates the 0-th oscillation signal (OSC0) through N-th oscillation signal (OSCn) upon receiving the 0-th bank-active command signal (BANK0_act) through N-th bank-active command signal (BANKn_act), respectively, from the bank-active command generator 300.

The active-voltage UP converter 400 includes first through (N+1)-th active-voltage UP converters 510~51n corresponding to 0-th through N-th banks, respectively, contained in the semiconductor memory, such that it generates the pumping voltage (Vpp) in response through 0-th oscillation signal to the N-th oscillation signal (OSCn) generated from the oscillation signal generator 400.

In more detail, the level detection unit 100 compares the reference voltage (Vref) with the division voltage of the pumping voltage (Vpp), and generates the level detection signal (DET). If the level detection signal (DET) has a low level, this indicates that the pumping voltage (Vpp) is equal to or higher than the target level, such that the pumping operation is no longer required.

Otherwise, if the level detection signal (DET) enters a high level, this indicates that the pumping voltage (Vpp) is less than the target level, such that the pumping operation is required. Therefore, the standby-voltage UP converter 200 performs pumping of the power-supply voltage upon receiving the high-level DET signal from the level detection unit 100. The oscillation signal generator 400 generates an oscillation signal upon receiving the high-level DET signal from the level detection unit 100.

In the meantime, if the row-active signal (ROW_act) and the row-precharge signal (ROW_pre) are applied to the bank-active command generator 300 after the pumping-voltage level is determined to be the low level, the bank-active command generator 300 generates the 0-th to N-th active command signals (BANK0_act~BANKn_act) of a corresponding bank.

For example, provided that the 0-th active command signal (BANK0_act) is generated from the bank-active command generator 300, the oscillation signal generator 400 operates the first pulse generator 411 in response to the 0-th bank-active command signal (BANK0_act), and outputs the pulse signal (out0) to the NAND gate 431.

In this case, the low-level DET signal is applied from the level detection unit 100 to the NAND gate 421, such that the NAND gate 421 transmits a high-level output signal to the other input terminal of the NAND gate 431.

The NAND gate 431 generates a high-level oscillation signal (OSC0) in response to the pulse signal (out0) and the high-level output signal of the NAND gate 421. The oscillation signal (OSC0) is applied to the first active-voltage UP converter 510, thereby increasing the pumping voltage (Vpp).

In this case, before the level detection unit 100 detects the pumping-voltage level, the oscillation signal (OSC0) is generated during a predetermined period corresponding to a delay time of the inverter chain (451~45n).

If the pumping-voltage level increases by activation of the 0-th bank, a current-consumption area R2 occurs as depicted in FIG. 8, such that the first active-voltage UP converter 510 continuously performs the pumping operation.

Figure 2:
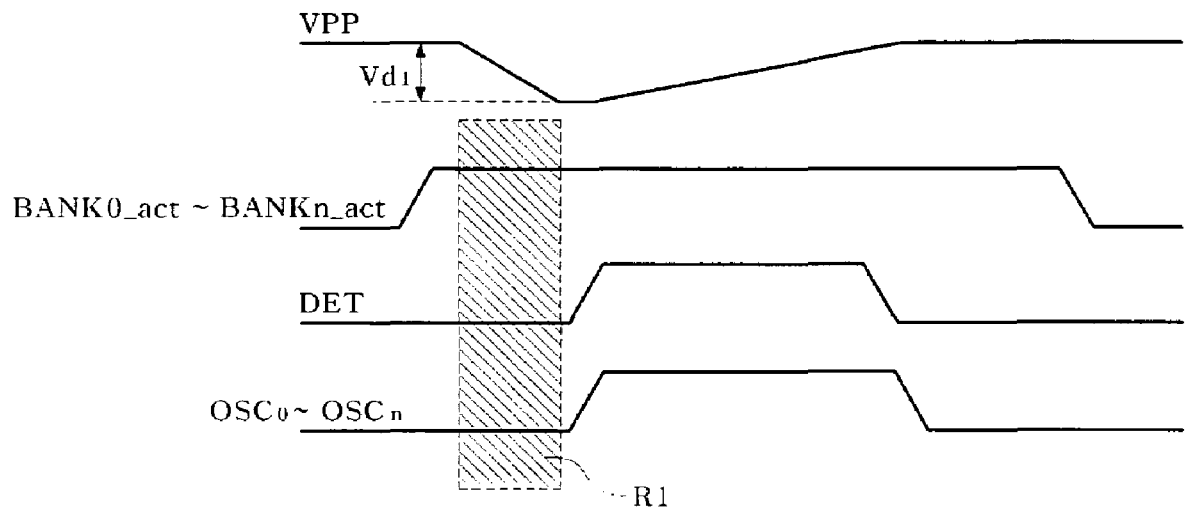
FIG. 2 is a waveform diagram illustrating operation signals of a step-up voltage generator of the conventional semiconductor memory.

In this case, the current consumption of the first active-voltage UP converter 511 is larger than the pumping-driving capacity of the first active-voltage UP converter 511 at the above-mentioned current-consumption area R2, such that the pumping voltage (Vpp) drops. In other words, the pumping voltage (Vpp) is reduced from the highest pumping voltage by a predetermined voltage Vd2, such that the pumping-voltage reduction Vd2 of FIG. 8 is less than the conventional pumping-voltage reduction Vd1 of FIG. 2.

In this case, if the pumping-voltage level is reduced at the current-consumption area R2, then the level detection unit 100 generates the high-level DET signal requiring the pumping operation.

Thereafter, the high-level DET signal and the first bank-active command signal (BANK1_act) are applied to the NAND gate 421, such that the NAND gate 421 generates a low-level output signal. The NAND gate 431 re-transmits the high-level oscillation signal (OSC1) to the first active-voltage UP converter 511. Therefore, the first active-voltage UP converter 511 continuously performs the pumping operation, thereby generating the pumping voltage (Vpp).

If the pumping-voltage level reaches the target-voltage level, the level detection unit 100 generates the low-level DET signal, such that the first active-voltage UP converter 511 does not perform the pumping operation any longer. It should be noted that the above-mentioned pumping operation is performed even when the first to N-th banks are activated.

As apparent from the above description, the step-up voltage generator for the semiconductor memory according to the preferred embodiment of the present disclosure receives the bank-active signals, generates pulse signals directly in response to the bank-active signals, transmits the oscillation signals to the active-voltage UP converter, and performs pumping of the power-supply voltage, such that it can solve the problems of the conventional step-up voltage generator. The conventional step-up voltage generator controls the DET signal to be enabled at the outside of a current-consumption area (R1) of the pumping voltage (Vpp), performs the pumping operation after the pumping voltage (Vpp) has dropped by a predetermined voltage (Vd1), and has very weak resistance to the driving of a memory cell when the pumping-voltage level instantaneously drops during the bank-active operation.

Therefore, the step-up voltage generator for the semiconductor memory according to the preferred embodiment of the present disclosure can facilitate the access operation of the memory cell, and can improve refresh characteristics of the memory cell.

Although the preferred embodiments of the present disclosure have been disclosed for illustrative purposes, those skilled in the art will appreciate that various modifications, additions and substitutions are possible, without departing from the scope and spirit of the disclosure and the accompanying claims.

This patent specification is based on and claims priority of Korean patent application no. 2006-61489, filed Jun. 30, 2006, the entire contents of which are incorporated by reference herein.

What is claimed is:

1. A step-up voltage generator for a semiconductor memory, comprising:
    a level detection unit configured to compare a reference voltage with a division voltage of a pumping voltage, detect a level of the pumping voltage according to the comparison result, and generate a level detection signal;
    a bank-active command generator configured to generate bank-active signals in response to a row-active command signal;
    an oscillation signal generator configured to generate pulse signals in response to the bank-active signals, and generate oscillation signals in response to the pulse signals or the level detection signal; and
    an active-voltage UP converter configured to pump a power-supply voltage in response to the oscillation signals, and generate a step-up voltage,
    wherein the oscillation signals are enabled when the bank-active signals are enabled or the level detection signal is enabled,
    wherein the oscillation signal generator includes:
    a pulse generator configured to generate pulse signals in response to the bank-active signals;
    a first logic circuit configured to perform a NAND operation in response to the bank-active signals and the level detection signal; and
    a second logic circuit configured to perform a NAND operation in response to output signals of the first logic circuit and the pulse generator.

2. The step-up voltage generator according to claim 1, wherein the first logic circuit includes at least one NAND gate, and the second logic circuit includes at least one NAND gate.

3. The step-up voltage generator according to claim 1, wherein the pulse generator includes:
    an inverter chain configured to delay the bank-active signals by a predetermined time; and
    a third logic circuit configured to perform a NAND operation in response to an output signal of the inverter chain and the bank-active signals.

4. The step-up voltage generator according to claim 3, wherein the third logic circuit is composed of a NAND gate.

5. A step-up voltage generator for a semiconductor memory comprising:
    a bank-active input unit including pulse generators configured to generate pulse signals in response to bank-active signals; and
    a driving-signal generator configured to determine whether the driving-signal generator received the bank-active signals from the bank-active input unit, and generate driving signals in response to the bank-active signals or a level detection signal of a pumping voltage,
    wherein the driving signals are enabled when the bank-active signals are enabled or the level detection signal is enabled
    wherein the driving signal generator includes:
    a first logic circuit configured to perform a NAND operation in response to the bank-active signals and the level detection signal; and a second logic circuit configured to perform a NAND operation in response to output signals of the first logic circuit and the bank-active input unit.

6. The step-up voltage generator according to claim 5, further comprising:

a level detection unit configured to compare a reference voltage with a division voltage of the pumping voltage, detect a level of the pumping voltage according to the comparison result, and transmit the level detection signal to the driving-signal generator.

7. The step-up voltage generator according to claim 5, further comprising:

an active-voltage UP converter configured to pump a power-supply voltage in response to the driving signals, and generate a step-up voltage.

8. The step-up voltage generator according to claim 5, wherein the bank-active input unit includes:

an inverter chain configured to delay the bank-active signals by a predetermined time; and a third logic circuit configured to perform a NAND operation in response to an output signal of the inverter chain and the bank-active signals.

9. A method for controlling a step-up voltage generator of a semiconductor memory, said method comprising:

(a) receiving a level detection signal from a level detection unit for detecting a level of a pumping voltage by comparing a reference voltage with a division voltage of the pumping voltage;

(b) determining whether bank-active signals are received from a bank active command generator; and (c) replying to the bank active signals or the level detection signal according to the determination result of (b), and generating oscillation signals;

(d) generating pulse signals in response to the bank-active signals, and generating the oscillation signals in response to the pulse signals, and if the bank-active signals are not received, oscillating the oscillation signals according to the level detection signal.

* * * * *